March 31, 1953  J. E. VANCE  2,633,519
ELECTRIC SWITCH AND CONDUCTOR ASSEMBLY
Filed May 19, 1949
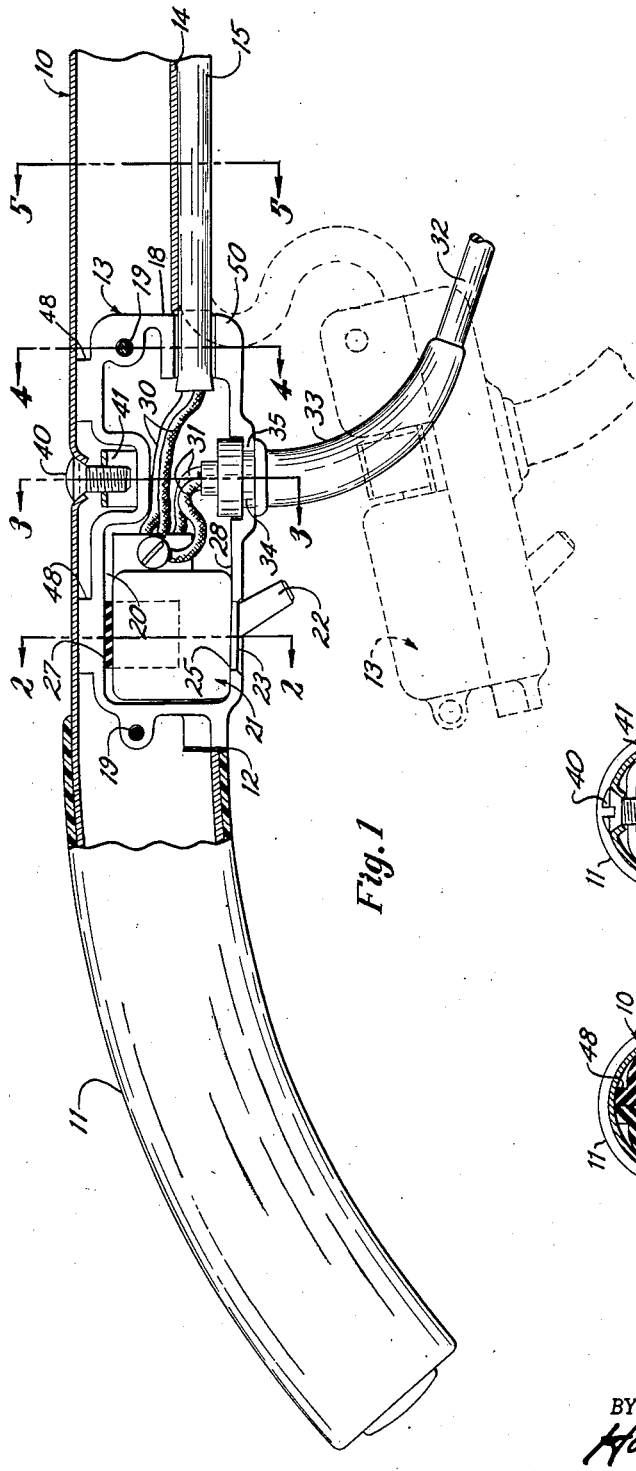
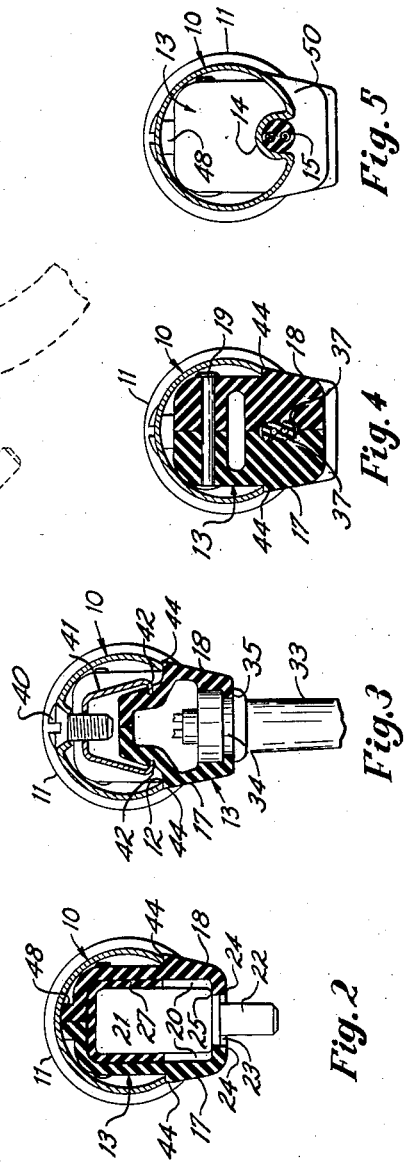
INVENTOR.
John E. Vance
BY
Harry S. Dunaree
ATTORNEY.

Patented Mar. 31, 1953

2,633,519

UNITED STATES PATENT OFFICE 2,633,519

ELECTRIC SWITCH AND CONDUCTOR ASSEMBLY

John E. Vance, Canton, Ohio, assignor to The Hoover Company, North Canton, Ohio, a corporation of Ohio Application May 19, 1949, Serial No. 94,137

1 Claim. (Cl. 200—168)

The invention relates to a switch and electric conductor assembly adapted to be inserted as a unit in handles for electrical appliances such as suction cleaners.

An object of the invention is to provide an improved switch and electric cord assembly which is housed as a unit prior to attachment to an electrical appliance. Another object is to provide a two-piece housing for securing therebetween a switch and two electric cords, whereby the assembled parts are attached as a unit to an electrical appliance, such as the handle of a suction cleaner. Other objects and advantages of the invention will be apparent from the following description and drawing wherein:

Figure 1 is a side view partly in section, of a suction cleaner handle showing in dotted lines the switch and cords assembled prior to insertion in the handle, and in full lines when positioned within the handle, and Figures 2 to 5 are sections taken along corresponding lines in Figure 1.

The embodiment of the invention as herein disclosed comprises the upper end of a suction cleaner handle 10 having a hand grip 11, and the unshown lower end of the handle is attached in a conventional manner to a cleaner body. Below the hand grip 11 in the under side of the handle is an opening 12 in which is disposed a housing 13 of a unitary switch and cord assembly. Formed in the handle 10 and extending from the lower end of the opening 12 is an elongated exterior recess 14 which receives an electric cord 15 for connection to the unshown motor of the appliance, which in this instance is a suction cleaner.

The housing 13 for the switch and cord assembly is formed in two complementary sections 17 and 18 of electric insulating material and the sections are secured together by a pair of rivets 19. The housing sections cooperate to form a cavity 20 in which is arranged a switch 21 having an operating lever 22 projecting through an opening 23 formed by the complementary portions 24—24 of the housing sections 17 and 18.

The switch is positioned in the cavity 20 by a shoulder 25 on the switch body abutting the defining edges 24 of the opening 23, and a resilient U-shaped member 27 is disposed between the switch body and the adjacent walls of the cavity 20 to force the switch body against the wall 28 of the cavity, and the shoulder 25 within the opening 23. Attached to the switch 21 are two leads 30 included in the cord 15, and a pair of leads 31 of a service cord 32 are also attached to the switch 21. The cord 32 is adapted to be connected to a source of current for the suction cleaner motor, and a sleeve 33 is disposed about the cord to prevent sharp bends in the latter when the appliance is in use.

One end of the cord protecting sleeve 33 is provided with a channel shaped groove 34 and the later receives a projecting flange 35 formed in each housing section to attach the cord 32 to the housing.

The motor cord 15 is secured to the housing 13 by recessed roughened walls 37—37 in the housing sections 17 and 18.

The housing is removably secured in the handle 10 by means of a screw 40 threaded into a bracket 41 provided with angular ends 42—42 seated in the housing 13, and the latter has shoulders 44 which abut the defining edges of the opening 12 to close the latter when the screw 40 is tightened to pull the housing into its proper position. A pair of projections 48—48 formed on the housing sections also abut the upper portion of the handle to assist in rigidly holding the housing 13 in the handle.

In assembling the parts in the housing 13 the switch 21, motor cord 15 and cord protector 33 are disposed in one of the housing sections and thereafter the other section is secured thereto by rivets 19. The attached sections 17 and 18 cooperate to hold the motor cord 15, cord protector 33 and switch 21 as an assembled operative unit separate from the handle 10. To attach the switch and conductor cord unit to the handle, the housing 13 is inserted through the opening 12 and the screw 40 is threaded into the bracket 41 to rigidly hold the housing in the handle. When the housing is in position in the handle it has a portion 50 projecting beyond the handle to align the motor cord 15 with the elongated recess 14 so that the motor cord 15 will extend from the housing in a straight line.

While I have shown and described but a single modification of my invention, it is to be understood that this modification is to be taken as illustrative only and not in a limiting sense. I do not wish to be limited to the particular structures shown and described, but to include all equivalent variations thereof except as limited by the scope of the claim.

I claim:

In combination with the handle of an electric appliance, means defining a housing recess in said handle and having an entrance opening, means defining an exterior cord recess in said handle and extending from one end of said housing recess, a combined switch and cord housing having a side wall and end wall normal to each other, a motor cord carried by said housing and projecting through said end wall, a service cord carried by said housing and projecting through said side wall, a switch in said housing and having an operating member projecting through said side wall for controlling current from said service cord to said motor cord, said housing with said motor cord, service cord and switch insertable as a unit through said entrance opening into said housing recess, said housing when inserted in said recess having means engaging said handle to position said motor cord in alignment with said exterior cord recess and said switch operating member and service cord projecting exteriorly of said entrance opening of said housing recess.

JOHN E. VANCE.

REFERENCES CITED

The following references are of record in the file of this patent:

UNITED STATES PATENTS

| Number | Name | Date |
|---|---|---|
| 1,195,363 | Kirby | Aug. 22, 1916 |
| 1,918,450 | Broeske | July 18, 1933 |
| 2,098,077 | White | Nov. 2, 1937 |
| 2,176,119 | Brown | Oct. 17, 1939 |
| 2,238,173 | Kasper | Apr. 15, 1941 |
| 2,272,164 | Neil | Feb. 3, 1942 |